Jan. 19, 1960

J. P. GREENING 2,921,738

POLYNOMIAL MULTIPLIER

Filed April 18, 1955

INVENTOR.
J. P. GREENING

BY *Hudson & Young*

ATTORNEYS

Jan. 19, 1960 J. P. GREENING 2,921,738
POLYNOMIAL MULTIPLIER
Filed April 18, 1955 5 Sheets-Sheet 2

INVENTOR.
J. P. GREENING

BY *Hudson & Young*

ATTORNEYS

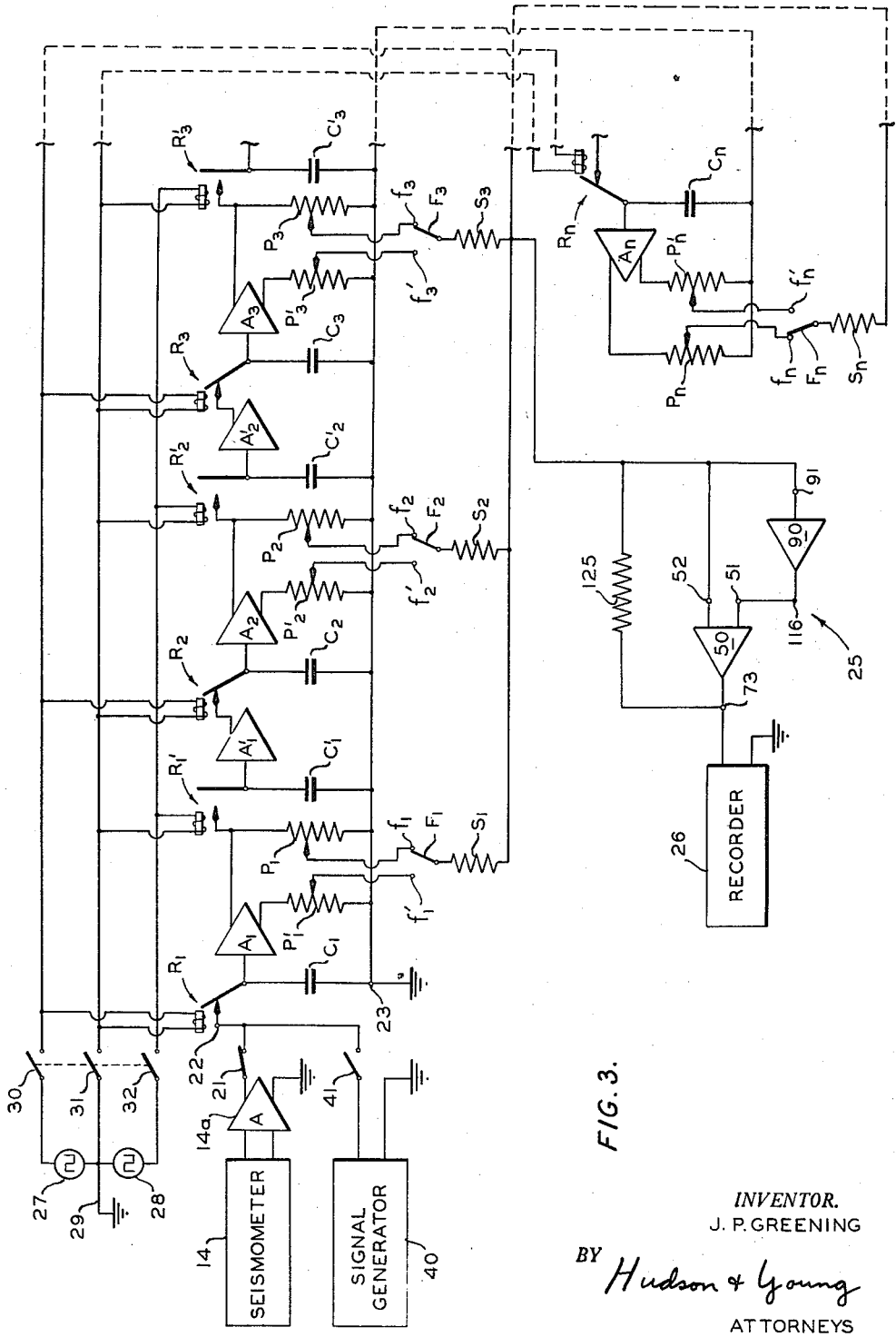

Jan. 19, 1960   J. P. GREENING   2,921,738
POLYNOMIAL MULTIPLIER
Filed April 18, 1955   5 Sheets-Sheet 4

INVENTOR.
J. P. GREENING
BY *Hudson & Young*
ATTORNEYS

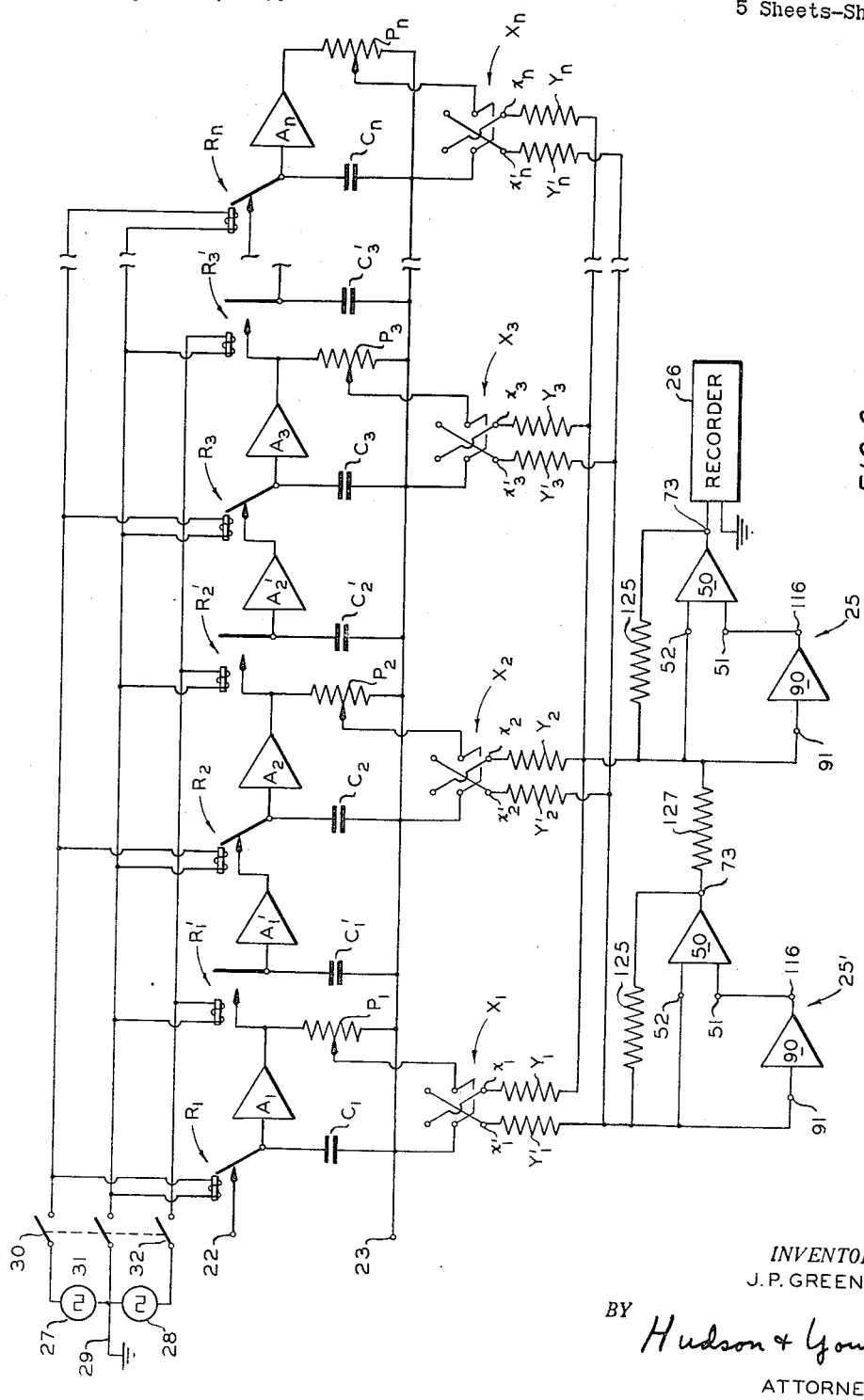

United States Patent Office 2,921,738
Patented Jan. 19, 1960

2,921,738

POLYNOMIAL MULTIPLIER

John P. Greening, Bartlesville, Okla., assignor to Phillips Petroleum Company, a corporation of Delaware Application April 18, 1955, Serial No. 501,883

8 Claims. (Cl. 235—181)

This invention relates to apparatus for transforming seismic signals. In another aspect it relates to apparatus for multiplying algebraic polynomials.

In geophysical prospecting, valuable information can often be obtained concerning subsurface formations by means of seismic surveys. A plurality of vibration responsive devices (seismometers) are positioned at or near the surface of the earth in a predetermined geometric array and an explosive charge is detonated at a region spaced therefrom. Vibrations emitted from the explosive charge travel downwardly into the earth and are reflected from various formations back to the vibration responsive elements. These elements are connected to suitable recording means. The seismic signals thus recorded generally are complex waves having numerous components. If the individual reflections are spaced a considerable distance apart, the reflected wave forms can often be detected in the recorded signals. However, in actual practice the recorded reflections normally are spaced so closely together that the reflection patterns from a number of discontinuities are superimposed to form a wave of complex charatcer. Furthermore, the interpretation of these signals may be complicated by the presence of interfering waves.

In accordance with one aspect of the present invention, apparatus is provided for transforming seismic signals. This apparatus multiplies the output signal of a seismometer by a selected wave form representing a reflected signal from a subterranean formation. The seismometer output is multiplied continuously by this selected wave form to provide a cross-correlation between the two signals. When the selected wave form is most nearly superimposed on the counterpart signal in the seismometer output the resulting product exhibits a maximum. By this procedure it is possible to identify a reflected wave pattern in the presence of random noise vibrations. The apparatus provided to perform this correlation comprises a plurality of electrical signal storage means which can be in the form of electrical condensers. Switching means are provided to apply sequential amplitudes of the seismometer signal successively to each of the signal storage means. Voltage multiplying means, which can be in the form of potentiometers, are associated with selected ones of the signal storage means to multiply the stored signal by a selected factor. The outputs of the multiplying means are summed and applied to a recording instrument.

The apparatus of this invention can also be employed to advantage to multiply one algebraic polynomial by another. The settings of the multiplying means are established in accordance with the coefficients of the first of the polynomials to be multiplied. A signal generator is employed to provide an electrical signal which varies in amplitude in accordance with the coefficients of the second of the polynomials. The output of the signal generator is applied to the first of the storage means in the same manner as is the output signal of the seismometer when the apparatus is employed to transform seismic signals.

Accordingly, it is an object of this invention to provide apparatus for transforming seismic signals to identify selected wave patterns.

Another object is to provide apparatus for interpreting seismic signals by means of a cross-correlation function.

A further object is to provide apparatus to multiply one algebraic polynomial by another.

Other objects, advantages and features of the invention should become apparent from the following detailed description, taken in conjunction with the accompanying drawing, in which:

Figure 3 is a schematic circuit diagram of a first embodiment of the signal multiplying apparatus of this invention;

Figure 8 is a schematic circuit drawing of a second embodiment of the signal multiplying apparatus of this invention.

Figure 1:
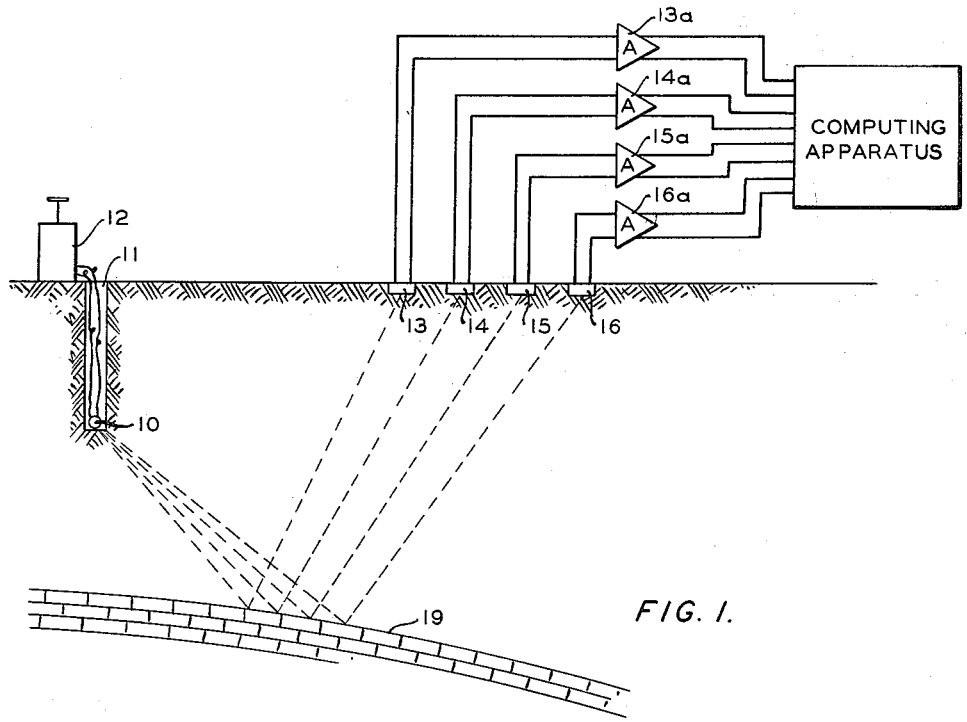
Figure 1 is a schematic representation of a seismic exploration system.

Referring now to the drawing in detail and to Figure 1 in particular, there is shown a seismic exploration system wherein an explosive charge 10 is positioned within a shot hole 11 and electrically connected to a detonator 12 positioned at the surface. Detonation of explosive charge 10 results in vibrations being transmitted outwardly therefrom in all directions. A plurality of vibration responsive seismometers 13, 14, 15 and 16 is positioned at or near the surface of the earth in a predetermined geometric array with respect to shot hole 11. Vibrational waves travel downwardly from explosive charge 10 and are reflected upwardly from a bed such as 19 to the several illustrated seismometers. It should be evident from an inspection of Figure 1 that the reflected waves arrive at the four seismometers at slightly different times. Seismometer 13 is energized first and there is a short time delay between the subsequent arrivals of the reflected waves at seismometers 14, 15 and 16. The difference in time between the arrivals of the signals at the several seismometers is due to differences in the length of paths traveled by the reflected waves. The time of arrival of a reflected wave, is therefore, a definite function of the depth and the dip of bed 19. By measuring the time of arrival of the reflected signals at the different seismometers, the depth and dip of bed 19 can be determined if the velocities of the seismic waves in the formations between bed 19 and the surface of the earth are known.

Figure 2A:
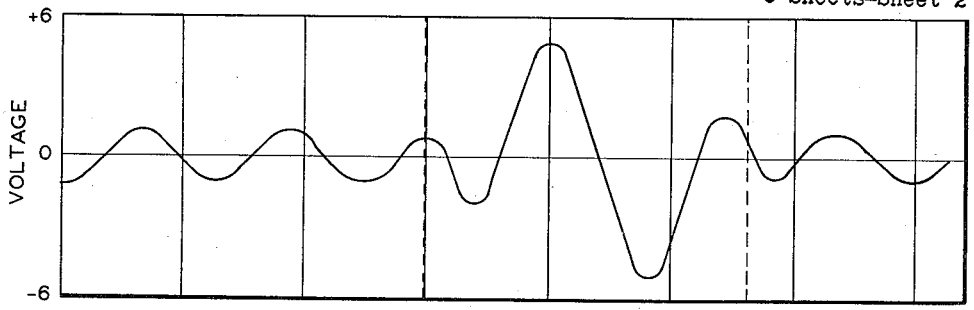
Figures 2a and 2b are graphical representations of the types of signals received by the seismometer in Figure 1.

In order to determine the times of arrival of the reflected waves at the several seismometers it is common practice to amplify and record the vibrations received by the seismometers. By recording the several vibration paths side by side on a common recording medium it is sometimes possible to determine the times of arrival of the reflected waves by direct observation of the recorded traces. In Figure 2a there is illustrated a somewhat ideal record of such recorded vibrations at a single seismometer. The magnitude of the voltage induced in the seismometer by the reflected wave incident thereon is ploted as a function of time. The vibration pattern illustrated between the time intervals $t_{15}$ and $t_{28}$ represents a wave reflected from bed 19, for example.

Figure 2B:
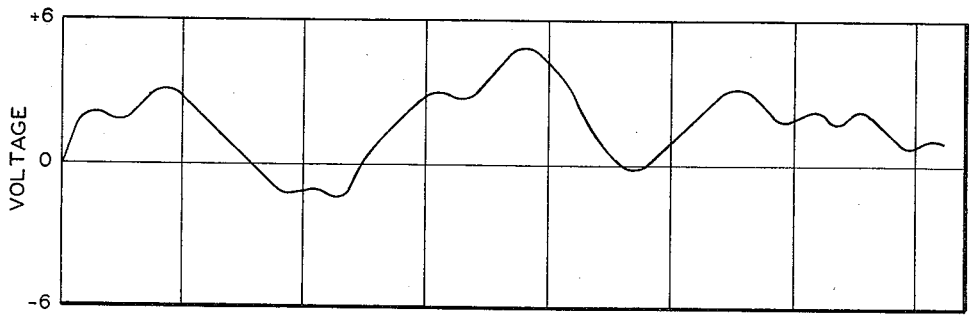
Figure 2C:
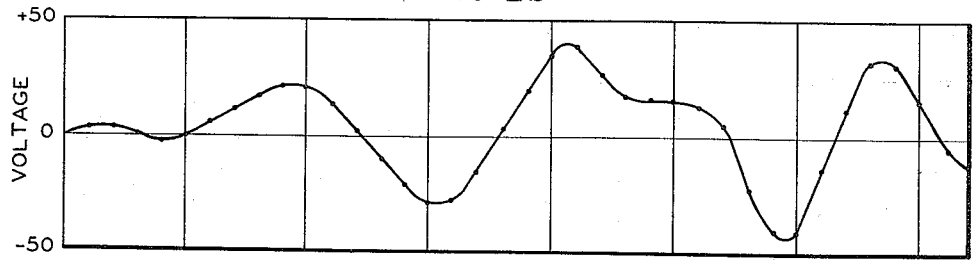
Figures 2c and 2d are graphical representations of transformed signals obtained in accordance with the present invention.

As is well known, surface waves, refracted waves and other more or less random waves are also generated by the detonation of explosive charge 10. In actual practice the problem of identifying a reflected wave in the recorded signal is complicated by the fact that these stray vibrations of varying amplitude and frequency are received at the seismometer as well as the desired reflection. In Figure 2b there is illustrated a curve which more closely approximates the vibration actually received by one of the seismometers. However, even the curve of Figure 2b is idealized to a certain extent. The presence of these random vibrations obviously complicates the problem of identifying the reflected wave to determine the exact time of arrival.

The computing mechanism of the present invention is provided to identify reflected signals in the presence of random noise vibrations. The outputs of seismometers 13, 14, 15 and 16 are amplified by respective amplifiers 13a, 14a, 15a and 16a and applied to the computing apparatus of this invention. A first embodiment of this apparatus is illustrated schematically in Figure 3. The output terminals of seismometer amplifier 14a, for example, are connected to a switch 21 and to ground, respectively. The second terminal of switch 21 is connected to a terminal 22 which represents the first input terminal of the signal multiplying apparatus. The second input terminal 23 of the apparatus is connected to ground.

Input terminal 22 is connected through a first relay $R_1$ to the first terminal of a capacitor $C_1$ and to an input terminal of an amplifier $A_1$. The second terminal of capacitor $C_1$ is connected to ground. The first output terminal of amplifier $A_1$ is connected to the first end terminal of a potentiometer $P_1$, and the second ouptut terminal of amplifier $A_1$ is connected to the first end terminal of a second potentiometer $P_1'$. The second end terminals of potentiometers $P_1$ and $P_1'$ are connected to ground. Amplifier $A_1$ has unity gain and provides both positive and negative ouptut signals. The positive signal is applied across potentiometer $P_1$ and the negative signal is applied across potentiometer $P_1'$. The first output terminal of amplifier $A_1$ is connected through a relay $R_1'$ to the first terminal of a capacitor $C_1'$ and to an input terminal of an amplifier $A_1'$. The second terminal of capacitor $C_1'$ is connected to ground. Amplifier $A_1'$ has unity gain and a single positive output terminal which is connected through a relay $R_2$ to the first terminal of a capacitor $C_2$ and to an input terminal of a amplifier $A_2$. The contactors of potentiometer $P_1$ and $P_1'$ are connected to respective terminals $f_1$ and $f_1'$ which are engaged selectively by switch $F_1$. Switch $F_1$ is connected through an isolating resistor $S_1$ to the input of a summing amplifier 25, which is described in detail hereinafter. The output of amplifier 25 is connected to the input of a recorder 26.

Relay $R_1$ is actuated periodically by the output signal of a generator 27, which preferably provides square wave but the output pulses. Relay $R_1'$ is operated periodically but the output signal of a second square wave generator 28. Generators 27 and 28 provide signals of the same frequency but which are 180° out of phase with one another. The two generators are connected with a common ground terminal 29 so that relays $R_1$ and $R_1'$ are energized alternatively. As illustrated, relay $R_1$ is energized whereas relay $R_1'$ is not. Thus, input terminal 22 is connected to amplifier $A_1$ and the connection between the output of amplifier $A_1$ and the input of amplifier $A_1'$ is broken.

The signal multiplying apparatus illustrated in Figure 3 comprises a plurality of units identical to the one thus far described. The number of these units is determined by the accuracy to which the multiplication is to be performed and by the number of terms in the polynomials being multiplied. The illustrated relays $R_1, R_2, R_3 \ldots R_n$ are energized simultaneously by signal generator 27. Relays $R_1', R_2', R_3' \ldots R_{n-1}'$ are energized simultaneously by signal generator 28. Switches $F_1, F_2 \ldots F_n$ are connected through respective isolating resistors $S_1, S_2 \ldots S_n$ to the input of summing amplifier 25.

In the operation of the apparatus of the present invention to transform seismic signals, it is necessary to determine the approximate wave form of the reflected signal to be identified. This can be accomplished either from theoretical considerations or by firing one or more preliminary shots in the area being investigated. Normally a location can be found where recorded traces at the seismometers are sufficiently free from external vibrations to enable the reflected wave form to be determined, at least to a close approximation. In making these preliminary shots the output signals from the seismometers are applied directly to conventional recording instruments.

For this purposes of discussion it will be assumed that the desired reflected wave pattern to be recognized is of the form illustrated in Figure 2a between time intervals $t_{15}$ and $t_{28}$. This wave is divided along the abscissa into as many equally spaced ordinates (fourteen, for example) as multiplying units are provided in the apparatus of Figure 3. In this example, n represents 14. The values of the ordinates of the curve of Figure 2a at each sequential time interval are set on a respective one of the potentiometers in each of the units. Thus, at time $t_{15}$ the ordinate of the curve has a value of +1 and at time $t_{16}$ the ordinate has a value of zero. These ordinate values are established on the corresponding potentiometers in the conventional manner for multiplication. For example, let it arbitrarily be assumed that the non-grounded end terminal of potentiometer $P_1$ is at +5 volts. In order to establish the value of +1 on this potentiometer, the contactor thereof is positioned one-fifth the distance between the grounded end terminal and the non-grounded end terminal. The voltage appearing at the contactor of potentiometer $P_1$ is thus +1 volt. If the voltage across potentiometer $P_1$ should increase to +25 volts, for example, the voltage at the contactor thereof is increased by a factor of five to +5 volts. Switch $F_1$ is positioned in engagement with terminal $f_1$.

The second ordinate value of the curve at time $t_{16}$ is set on the second unit by grounding the contactor of potentiometer $P_2$ or by positioning switch $F_2$ so as not to engage either of its associated terminals. The third ordinate value at time $t_{17}$ of −2 volts is set on potentiometer $P_3'$. The primed potentiometers accommodate negative values. Switch $F_3$ is moved into engagement with terminal $f_3'$.

Once the ordinate values of the curve illustrated in Figure 2a are set on the respective potentiometers, the mechanism is ready for operation. Seismometer 14 is positioned at the desired location and explosive charge 10 is detonated. Switches 30, 31 and 32 are closed to apply signal generators 27 and 28 across the several relays. The frequency of generators 27 and 28 is such that the period of one cycle is equal to one time interval represented in Figure 2a. For purposes of discussion it will be assumed that a seismometer 14 provides an output signal of the form illustrated by the curve of Figure 2b. At time $t_0$ a voltage signal corresponding to the zero abscissa of the curve of Figure 2b is applied through relay $R_1$ to capacitor $C_1$. This signal is also applied through amplifier $A_1$ across potentiometer $P_1$. The signal applied across potentiometer $P_1$ is multiplied by the contactor setting of potentiometer $P_1$ and applied as the first input to summing amplifier 25. The multiplication of the zero output signal by the +1 setting on potentiometer $P_1$ results in a zero output signal to amplifier 25 at this time.

During the following half cycle of the signals from generators 27 and 28, relay $R_1'$ is energized and relay $R_1$ is deenergized. This results in the zero voltage signal originally applied across potentiometer $P_1$ being applied to capacitor $C_1'$. During the next half cycle relays $R_1$ and $R_2$ are again energized and relay $R_1'$ is deenergized. The zero voltage signal previously applied to capacitor $C_1'$ is thus applied through amplifier $A_1'$ to capacitor $C_2$ and through amplifier $A_2$ across potentiometer $P_2$. The zero voltage applied across potentiometer $P_2$ is multiplied by the zero setting of this potentiometer to form an output voltage of zero which is applied to the input of summing amplifier 25 to form a portion of the second term in the output signal. At this same time, the second increment of the incoming signal, which is represented at $t_1$ in Figure 2, is applied to capacitor $C_1$ and across potentiometer $P_1$. This voltage signal of +2 volts is multiplied by the +1 setting of potentiometer $P_1$ to provide an output signal of +2 volts which is applied through resistor $S_1$ to the input of summing amplifier 25. This +2 volts signal is added to the zero volt signal applied to summing amplifier 25 through resistors $S_2$. It should thus be apparent that each increment of the incoming signal from seismometer 14 is successively applied to the several capacitors and multiplying potentiometers of the circuit of Figure 3. The multiplied voltages are summed by amplifier 25 and applied to recorder 26. This multiplication and summation process is illustrated mathematically in the following table.

TABLE I
*Potentiometer settings*

| $P_1$ | $P_2$ | $P_3'$ | $P_4$ | $P_5$ | $P_6$ | $P_7$ | $P_8$ | $P_9'$ | $P_{10}'$ | $P_{11}'$ | $P_{12}$ | $P_{13}$ | $P_n$ |
|---|---|---|---|---|---|---|---|---|---|---|---|---|---|
| 1 | 0 | −2 | 0 | 3 | 5 | 3 | 0 | −3 | −5 | −3 | 0 | 2 | 0 |

| Input Signal | $P_1$ | $P_2$ | $P_3'$ | $P_4$ | $P_5$ | $P_6$ | $P_7$ | $P_8$ | $P_9'$ | $P_{10}'$ | $P_{11}'$ | $P_{12}$ | $P_{13}$ | Output Signal |
|---|---|---|---|---|---|---|---|---|---|---|---|---|---|---|
| 0 | ---- | ---- | ---- | ---- | ---- | ---- | ---- | ---- | ---- | ---- | ---- | ---- | ---- | 0 |
| 2 | 0 | ---- | ---- | ---- | ---- | ---- | ---- | ---- | ---- | ---- | ---- | ---- | ---- | 2 |
| 2 | 2 | 0 | ---- | ---- | ---- | ---- | ---- | ---- | ---- | ---- | ---- | ---- | ---- | 2 |
| 2 | 2 | 2 | 0 | ---- | ---- | ---- | ---- | ---- | ---- | ---- | ---- | ---- | ---- | −2 |
| 3 | 2 | 2 | 2 | 0 | ---- | ---- | ---- | ---- | ---- | ---- | ---- | ---- | ---- | −1 |
| 3 | 3 | 2 | 2 | 2 | 0 | ---- | ---- | ---- | ---- | ---- | ---- | ---- | ---- | 5 |
| 2 | 3 | 3 | 2 | 2 | 2 | 0 | ---- | ---- | ---- | ---- | ---- | ---- | ---- | 12 |
| 1 | 2 | 3 | 3 | 2 | 2 | 2 | 0 | ---- | ---- | ---- | ---- | ---- | ---- | 17 |
| 0 | 1 | 2 | 3 | 3 | 2 | 2 | 2 | 0 | ---- | ---- | ---- | ---- | ---- | 21 |
| −1 | 0 | 1 | 2 | 3 | 3 | 2 | 2 | 2 | 0 | ---- | ---- | ---- | ---- | 21 |
| −1 | −1 | 0 | 1 | 2 | 3 | 3 | 2 | 2 | 2 | 0 | ---- | ---- | ---- | 13 |
| −1 | −1 | −1 | 0 | 1 | 2 | 3 | 3 | 2 | 2 | 2 | 0 | ---- | ---- | 1 |
| −1 | −1 | −1 | −1 | 0 | 1 | 2 | 3 | 3 | 2 | 2 | 2 | 0 | ---- | −13 |
| 1 | −1 | −1 | −1 | −1 | 0 | 1 | 2 | 3 | 3 | 2 | 2 | 2 | 0 | −23 |
| 2 | 1 | −1 | −1 | −1 | −1 | 0 | 1 | 2 | 3 | 3 | 2 | 2 | 2 | −30 |
| 3 | 2 | 1 | −1 | −1 | −1 | −1 | 0 | 1 | 2 | 3 | 3 | 2 | 2 | −28 |
| 3 | 3 | 2 | 1 | −1 | −1 | −1 | −1 | 0 | 1 | 2 | 3 | 3 | 2 | −17 |
| 3 | 3 | 3 | 2 | 1 | −1 | −1 | −1 | −1 | 0 | 1 | 2 | 3 | 3 | −2 |
| 4 | 3 | 3 | 3 | 2 | 1 | −1 | −1 | −1 | −1 | 0 | 1 | 2 | 3 | 18 |
| 5 | 4 | 3 | 3 | 3 | 2 | 1 | −1 | −1 | −1 | −1 | 0 | 1 | 2 | 34 |
| 4 | 5 | 4 | 3 | 3 | 3 | 2 | 1 | −1 | −1 | −1 | −1 | 0 | 1 | 37 |
| 3 | 4 | 5 | 4 | 3 | 3 | 3 | 2 | 1 | −1 | −1 | −1 | −1 | 0 | 29 |
| 1 | 3 | 4 | 5 | 4 | 3 | 3 | 3 | 2 | 1 | −1 | −1 | −1 | −1 | 19 |
| 0 | 1 | 3 | 4 | 5 | 4 | 3 | 3 | 3 | 2 | 1 | −1 | −1 | −1 | 14 |
| 0 | 0 | 1 | 3 | 4 | 5 | 4 | 3 | 3 | 3 | 2 | 1 | −1 | −1 | 15 |
| 1 | 0 | 0 | 1 | 3 | 4 | 5 | 4 | 3 | 3 | 3 | 2 | 1 | −1 | 14 |
| 2 | 1 | 0 | 0 | 1 | 3 | 4 | 5 | 4 | 3 | 3 | 3 | 2 | 1 | 0 |
| 3 | 2 | 1 | 0 | 0 | 1 | 3 | 4 | 5 | 4 | 3 | 3 | 3 | 2 | −23 |
| 3 | 3 | 2 | 1 | 0 | 0 | 1 | 3 | 4 | 5 | 4 | 3 | 3 | 3 | −41 |
| 2 | 3 | 3 | 2 | 1 | 0 | 0 | 1 | 3 | 4 | 5 | 4 | 3 | 3 | −39 |
| 2 | 2 | 3 | 3 | 2 | 1 | 0 | 0 | 1 | 3 | 4 | 5 | 4 | 3 | −15 |
| 2 | 2 | 2 | 3 | 3 | 2 | 1 | 0 | 0 | 1 | 3 | 4 | 5 | 4 | 16 |
| 2 | 2 | 2 | 2 | 3 | 3 | 2 | 1 | 0 | 0 | 1 | 3 | 4 | 5 | 33 |
| 2 | 2 | 2 | 2 | 2 | 3 | 3 | 2 | 1 | 0 | 0 | 1 | 3 | 4 | 31 |
| 1 | 2 | 2 | 2 | 2 | 2 | 3 | 3 | 2 | 1 | 0 | 0 | 1 | 3 | 13 |
| 1 | 1 | 2 | 2 | 2 | 2 | 2 | 3 | 3 | 2 | 1 | 0 | 0 | 1 | −3 |
| 1 | 1 | 1 | 2 | 2 | 2 | 2 | 2 | 3 | 3 | 2 | 1 | 0 | 0 | −9 |

The numerical values in the top row of Table I represent the ordinate values of the curve of Figure 2a between times $t_{15}$ and $t_{28}$. The values in the left-hand vertical column represent the ordinate values of the curve of Figure 2b between the times zero and $t_{36}$. The values in the right-hand vertical column represent the summation of the product applied to the recorder 26. For any given horizontal row, the value in the right-hand summation column is obtained by multiplying each value in the horizontal row by the value appearing above that same row in the first horizontal column and summing the individual products. The values in the right-hand vertical column, proceeding downwardly, are applied sequentially to recorder 26. These values are plotted as a function of time in Figure 2c.

For purposes of description it will be assumed that the reflection curve illustrated in Figure 2b arrives at seismometer 13 at two time intervals prior to the arrival of the same curve at seismometer 14. Thus, the first output voltage of seismometer 13 is +2 as represented by time $t_2$ in Figure 2b. The output of seismometer 13 is applied to a multiplying circuit identical to that illustrated in Figure 3. The corresponding multiplication and summation process for the circuit associated with seismometer 13 is illustrated in the following table.

TABLE II
*Potentiometer settings*

| 1 | 0 | -2 | 0 | 3 | 5 | 3 | 0 | -3 | -5 | -3 | 0 | 2 | 0 | |
|---|---|---|---|---|---|---|---|---|---|---|---|---|---|---|
| Input Signal | | | | | | | | | | | | | | Output Signal |
| 2 | | | | | | | | | | | | | | 2 |
| 2 | ---- | ---- | ---- | ---- | ---- | ---- | ---- | ---- | ---- | ---- | ---- | ---- | ---- | 2 |
| 3 | 2 | ---- | ---- | ---- | ---- | ---- | ---- | ---- | ---- | ---- | ---- | ---- | ---- | -1 |
| 3 | 3 | 2 | ---- | ---- | ---- | ---- | ---- | ---- | ---- | ---- | ---- | ---- | ---- | -1 |
| 2 | 3 | 2 | 2 | ---- | ---- | ---- | ---- | ---- | ---- | ---- | ---- | ---- | ---- | 2 |
| 1 | 2 | 3 | 2 | 2 | ---- | ---- | ---- | ---- | ---- | ---- | ---- | ---- | ---- | 11 |
| 0 | 1 | 2 | 3 | 2 | 2 | ---- | ---- | ---- | ---- | ---- | ---- | ---- | ---- | 21 |
| -1 | 0 | 1 | 2 | 3 | 2 | 2 | ---- | ---- | ---- | ---- | ---- | ---- | ---- | 27 |
| -1 | -1 | 0 | 1 | 2 | 3 | 2 | 2 | ---- | ---- | ---- | ---- | ---- | ---- | 23 |
| -1 | -1 | -1 | 0 | 1 | 2 | 3 | 2 | 2 | ---- | ---- | ---- | ---- | ---- | 7 |
| -1 | -1 | -1 | -1 | 0 | 1 | 2 | 3 | 2 | 2 | ---- | ---- | ---- | ---- | -13 |
| 1 | -1 | -1 | -1 | -1 | 0 | 1 | 2 | 3 | 2 | 2 | ---- | ---- | ---- | -27 |
| 2 | 1 | -1 | -1 | -1 | -1 | 0 | 1 | 2 | 3 | 2 | 2 | ---- | ---- | -30 |
| 3 | 2 | 1 | -1 | -1 | -1 | -1 | 0 | 1 | 2 | 3 | 2 | 2 | ---- | -28 |
| 3 | 3 | 2 | 1 | -1 | -1 | -1 | -1 | 0 | 1 | 2 | 3 | 2 | 2 | -17 |
| 3 | 3 | 3 | 2 | 1 | -1 | -1 | -1 | -1 | 0 | 1 | 2 | 3 | 2 | -2 |
| 3 | 3 | 3 | 3 | 2 | 1 | -1 | -1 | -1 | -1 | 0 | 1 | 2 | 3 | 18 |
| 4 | 3 | 3 | 3 | 3 | 2 | 1 | -1 | -1 | -1 | -1 | 0 | 1 | 2 | 34 |
| 5 | 4 | 3 | 3 | 3 | 3 | 2 | 1 | -1 | -1 | -1 | -1 | 0 | 1 | 37 |
| 4 | 5 | 4 | 3 | 3 | 3 | 3 | 2 | 1 | -1 | -1 | -1 | -1 | 0 | 29 |
| 3 | 4 | 5 | 4 | 3 | 3 | 3 | 3 | 2 | 1 | -1 | -1 | -1 | -1 | 19 |
| 1 | 3 | 4 | 5 | 4 | 3 | 3 | 3 | 3 | 2 | 1 | -1 | -1 | -1 | 14 |
| 0 | 1 | 3 | 4 | 5 | 4 | 3 | 3 | 3 | 3 | 2 | 1 | -1 | -1 | 15 |
| 0 | 0 | 1 | 3 | 4 | 5 | 4 | 3 | 3 | 3 | 3 | 2 | 1 | -1 | 14 |
| 1 | 0 | 0 | 1 | 3 | 4 | 5 | 4 | 3 | 3 | 3 | 3 | 2 | 1 | 0 |
| 2 | 1 | 0 | 0 | 1 | 3 | 4 | 5 | 4 | 3 | 3 | 3 | 3 | 2 | -23 |
| 3 | 2 | 1 | 0 | 0 | 1 | 3 | 4 | 5 | 4 | 3 | 3 | 3 | 3 | -41 |
| 3 | 3 | 2 | 1 | 0 | 0 | 1 | 3 | 4 | 5 | 4 | 3 | 3 | 3 | -39 |
| 2 | 3 | 3 | 2 | 1 | 0 | 0 | 1 | 3 | 4 | 5 | 4 | 3 | 3 | -15 |
| 2 | 2 | 3 | 3 | 2 | 1 | 0 | 0 | 1 | 3 | 4 | 5 | 4 | 3 | 16 |
| 2 | 2 | 2 | 3 | 3 | 2 | 1 | 0 | 0 | 1 | 3 | 4 | 5 | 4 | 33 |
| 2 | 2 | 2 | 2 | 3 | 3 | 2 | 1 | 0 | 0 | 1 | 3 | 4 | 5 | 31 |
| 2 | 2 | 2 | 2 | 2 | 3 | 3 | 2 | 1 | 0 | 0 | 1 | 3 | 4 | 13 |
| 1 | 2 | 2 | 2 | 2 | 2 | 3 | 3 | 2 | 1 | 0 | 0 | 1 | 3 | -3 |
| 1 | 1 | 2 | 2 | 2 | 2 | 2 | 3 | 3 | 2 | 1 | 0 | 0 | 1 | -9 |
| 1 | 1 | 1 | 2 | 2 | 2 | 2 | 2 | 3 | 3 | 2 | 1 | 0 | 0 | |

Figure 2D:
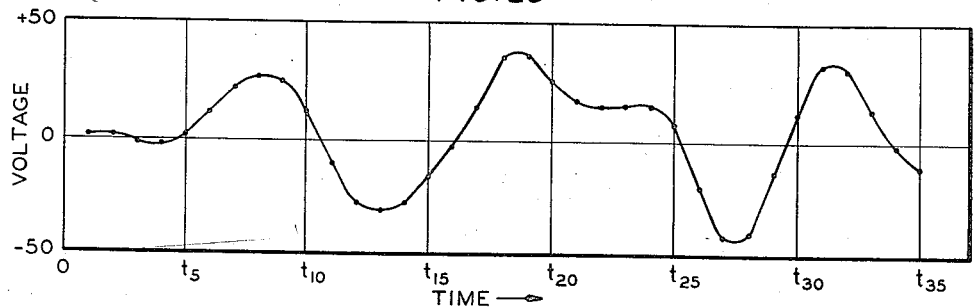

The values in the right-hand column of Table II represent the signal recorded by the output of the second summing circuit. This curve is illustrated in Figure 2d. From a comparison of the curves of Figures 2c and 2d it can be seen that a maximum negative peak occurs in Figure 2c between times $t_{29}$ and $t_{30}$. A corresponding maximum negative peak occurs in Figure 2d between the times $t_{27}$ and $t_{28}$. This difference in time between the two maximum negative peaks represents the difference in time of arrival of the reflected wave pattern from bed 19 at seismometers 13 and 14. The operation thus performed by the apparatus of the invention is one of cross-correlation wherein the function set on the potentiometer is correlated with the corresponding function as it appears in the input signal. While the illustrated example has assumed a somewhat ideal wave form, it should be apparent that by dividing the desired wave pattern into a large number of segments a correlation of any desired accuracy can be made.

It will be noted that the correlation operation herein described involves the multiplication of one signal by another. The signals can be expressed in the forms of algebraic polynomials of the general form:

$$a_0 + a_1 X + a_2 X^2 + \ldots + a_n X^n$$

where the several $a$ coefficients represent the sequential amplitudes of the signal and the $X$'s denote the times of sampling. The X can be thought of as a Fourier delay operator $e^{-iwh}$ where $w$ is two pi times the frequency and $h$ is the time interval between samples. Algebraically it behaves like the variable in a polynomial. Thus, the apparatus can be used to multiply two polynomials in the same manner as the seismometer output is multiplied by a predetermined function. A signal generator is employed in place of the seismometer to provide an electrical signal representing one of the functions to be multiplied. The $a$ coefficients of the second function are set at the contactors of the P potentiometer. Such a signal generator 40 is illustrated in Figure 3. The first output terminal of a generator 40 is selectively connected through a switch 41 to input terminal 22. Signal generator 40 can advantageously be of the form disclosed in my copending application Serial No. 468,360, filed November 12, 1954, now Patent No. 2,855,147.

Figure 4:
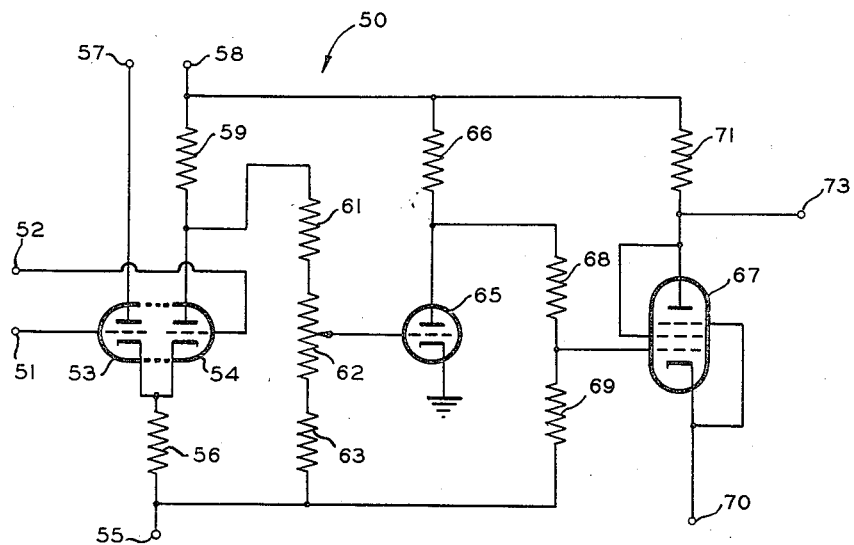
Figure 4 is a schematic circuit diagram of an amplifier employed in Figure 3.

In Figure 4 there is shown an amplifier which can be employed as the isolating amplifiers in Figure 3. The isolating amplifiers of Figure 3 are characterized by a high impedance input and a low impedance output. The amplifier 50 of Figure 4 is provided with first and second input terminals 51 and 52 which are connected to the respective control grids of triodes 53 and 54. The cathodes of triodes 53 and 54 are connected to one another and to a negative potential terminal 55 through a common resistor 56. The anode of triode 53 is connected to a positive potential terminal 57. The anode of triode 54 is connected to a positive potential terminal 58 through a resistor 59. The anode of triode 54 is also connected to terminal 55 through a resistor 61, a potentiometer 62 and a resistor 63, these elements being connected in series relation. The contactor of potentiometer 62 is connected to the control grid of a third triode 65. The cathode of triode 65 is connected to ground. The anode of triode 65 is connected to terminal 58 through a resistor 66. The anode of triode 65 is also connected to the control grid of a pentode 67 through a resistor 68. The control grid of pentode 67 is connected to terminal 55 through a resistor 69. The cathode and suppressor grid of pentode 67 are connected to one another and to a negative potential terminal 70. The screen grid and anode of pentode 67 are connected to one another and to terminal 58 through a resistor 71. The anode of pentode 67 is also connected to an output terminal 73. A feedback network is connected between output terminal 73 and input terminal 52 when amplifier 50 is connected in the circuit of Figure 3.

As previously mentioned, amplifier 50 has a high impedance input and a low impedance output. Representative values of the circuit components of this amplifier are as follows: resistor 56, 70,000 ohms; resistor 59, 1 megohm; resistor 61, 750,000 ohms; potentiometer 62, 500,000 ohms; resistor 63, 3.75 megohms; resistor 66, 250,000 ohms; resistor 68, 4 megohms; resistor 69, 2 megohms; resistor 71, 100,000 ohms; triodes 53 and 54, each one-half of a tube 12AX7; triode 65, a 6AQ6 tube; pentode 67, a 6AG5 tube; terminal 55 is maintained at —200 volts; terminal 70 is maintained —100 volts; terminal 57 is maintained at 200 volts; and terminal 58 is maintained at 300 volts.

If an input signal is applied to terminal 51, the amplifier has an even number of stages so that the output signal at terminal 73 is in phase with the input signal. The feedback network is adjusted so that the gain of the amplifier is unity. If an input signal is applied to terminal 52, the amplifier has an odd number of stages so that the output signal at terminal 73 is 180° out of phase with the input signal.

Figure 5:
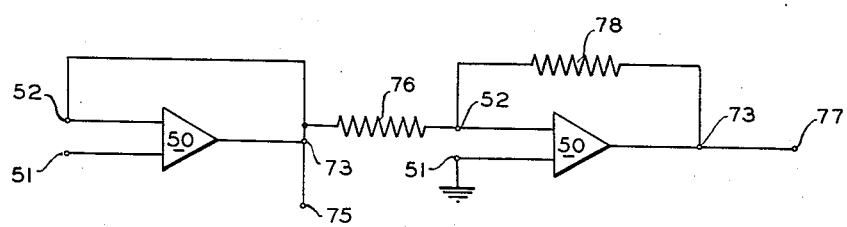
Figure 5 illustrates the manner in which amplifiers of Figure 4 are connected in the circuit of Figure 3.

The amplifiers $A_1$, $A_2$, $A_3$ . . . $A_n$ of Figure 3 are provided with both positive and negative output terminals. This requires two amplifiers 50 connected as illustrated in Figure 5. Input terminal 51 of amplifier $A_1$, for example, is connected directly to capacitor $C_1$. The output terminal 73 of the left-hand amplifier 50 is connected to an output terminal 75 which is connected to the end terminal of potentiometer $P_1$ of Figure 3. This output terminal 73 is also connected directly to the input terminal 52 of the left-hand amplifier 50. Left-hand terminal 73 is also connected through a resistor 76 to the input terminal 52 of the right-hand amplifier 50. Terminal 51 of the right-hand amplifier is connected to ground. Output terminal 73 of the right-hand amplifier is connected to an output terminal 77 which is connected to one end terminal of potentiometer $P_1'$. A feedback resistor 78 is connected between terminals 73 and 52 of the right-hand amplifier. Thus, terminal 75 provides the positive output whereas terminal 77 provides a negative output.

Figure 6:
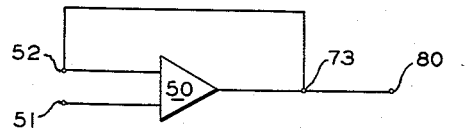
Figure 6 illustrates a second manner in which the amplifier of Figure 4 is connected in the circuit of Figure 3.

The amplifiers $A_1'$, $A_2'$ . . . $A_n'$ of Figure 3 require only a single positive output terminal. Thus, these amplifiers employ only a single amplifier 50 as illustrated in Figure 6. Terminal 51 represents the input terminal of these amplifiers. Terminal 73 is connected to the positive output terminal 80. Terminal 73 is also connected directly to terminal 52 to provide a degenerative feedback path to reduce the amplifier gain to unity.

Figure 7:
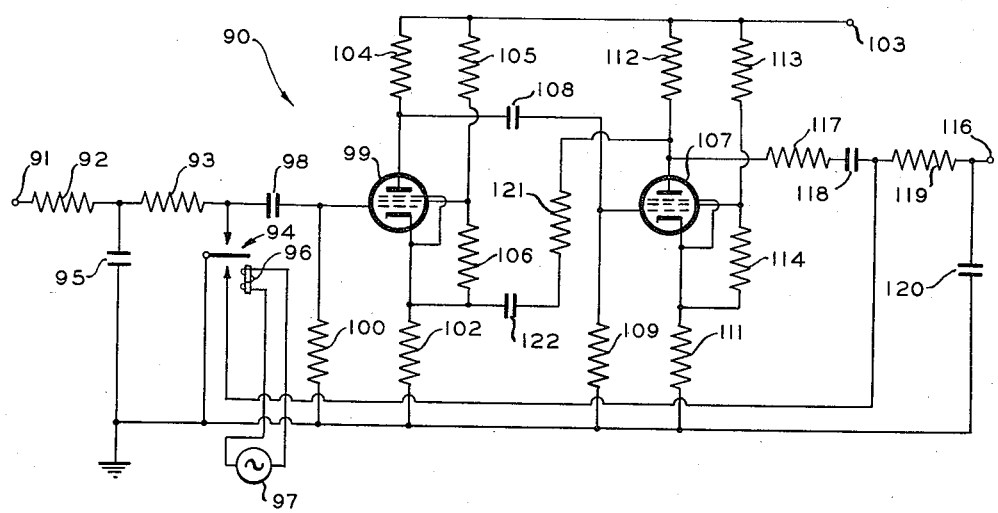
Figure 7 is a schematic representation of a portion of the summing amplifier of Figure 3.

Summing amplifier 25 of Figure 3 includes an amplifier 90 which can be of the form illustrated in Figure 7. The input terminal 91 of amplifier 90 is connected through a pair of series connected resistors 92 and 93 to one fixed contact of a synchronous chopper 94. The junction between resistors 92 and 93 is connected to ground through a capacitor 95. The movable arm of chopper 94 is connected to ground. Chopper 94 is energized by a coil 96, which is connected to a source of alternating current 97, so that the movable arm engages the two fixed contacts periodically at the frequency of current source 97. The first fixed contact of chopper 94 is connected through a capacitor 98 to the control grid of a pentode 99. The control grid of pentode 99 is connected to ground through a resistor 100. A direct potential applied to input terminal 91 thus results in the application of an alternating potential to the control grid of pentode 99.

The cathode of pentode 99 is connected to ground through a resistor 102. The anode of pentode 99 is connected to a positive potential terminal 103 through a resistor 104. The screen grid of pentode 99 is connected to terminal 103 through a resistor 105 and to the cathode of pentode 99 through a resistor 106. The suppressor grid of pentode 99 is internally connected to its cathode. The anode of pentode 99 is connected to the control grid of a second pentode 107 through a capacitor 108. The control grid of pentode 107 is connected to ground through a resistor 109. The cathode of pentode 107 is connected to ground through a resistor 111, and is also connected internally to the suppressor grid of pentode 107. The anode of pentode 107 is connected to terminal 103 through a resistor 112. The anode of pentode 107 is also connected to the cathode of pentode 99 through resistor 121 and capacitor 122. The screen grid of pentode 107 is connected to terminal 103 through a resistor 113 and to the cathode of pentode 107 through a resistor 114. The anode of pentode 107 is connected to an output terminal 116 through a resistor 117, a capacitor 118 and a resistor 119, these elements being connected in series relation. The junction between capacitor 118 and resistor 119 is connected to the second fixed contact of chopper 94. A capacitor 120 is connected between output terminal 116 and ground.

An input signal applied to terminal 91 of amplifier 90 is applied to the control grid of pentode 99 during alternate half cycles of signal applied to chopper 94. During the alternate half cycles, the control grid of pentode 99 is connected to ground through capacitor 98. This results in an alternating signal being applied to the input of pentode 99. This signal is amplified by pentodes 99 and 107 and applied to output terminal 116. The junction between capacitor 118 and resistor 119 is, however, connected to ground during alternate half cycles of the operation of chopper 94. This provides a rectifier in the output circuit of the amplifier. Resistor 119 and capacitor 120 serve to filter the rectified output signal so that a steady D.C. voltage appears between output terminal 116 and ground. Representative values of the circuit components of amplifier 90 are as follows: resistor 92, 240,000 ohms; resistors 93, 100 and 109, 2 megohms each; resistors 104 and 112, 390,000 ohms each; resistors 105 and 113, 100,000 ohms each; resistors 106 and 114, 24,000 ohms each; resistor 121, 1.2 megohms; resistors 102 and 111, 1000 ohms each; resistor 117, 1 megohm; resistor 119, 5.1 megohms; capacitors 98 and 118, 0.05 microfarad; capacitors 95 and 122, 0.1 microfarad; capacitor 108, 0.005 microfarad; capacitor 120, 5 microfarad; pentodes 99 and 107, each 6AK5 tubes; and potential terminal 103 is maintained at 200 volts.

Summing amplifier 25 of Figure 3 comprises both an amplifier 90 and an isolating amplifier 50. The common junction of the second terminals of isolating resistors $S_1$, $S_2$, $S_3$ . . . $S_n$ is connected to input terminal 91 of amplifier 90 and to the input terminal 52 of an amplifier 50. Output terminal 116 of amplifier 90 is connected directly to input terminal 51 of amplifier 50. A feedback resistor 125 is connected between terminals 73 and 52 of amplifier 50. Output terminal 73 is connected to the first input terminal of recorder 26. The second input terminal of recorder 26 is connected to ground. The voltage amplified by amplifier 90 is substantially drift-free. This drift-free voltage is applied to input terminal 51 of amplifier 50. The voltages to be summed are applied to input terminal 52. The drift-free reference voltage applied to terminal 51 reduces the drift of amplifier 50 to provide stable D.C. summing.

In Figure 8 there is illustrated a second embodiment of the voltage multiplying and summing circuit which requires fewer amplifiers. The basic circuit of the isolating amplifiers and the signal storage capacitors is identical to the corresponding circuit of Figure 3 and corresponding elements are designated by like reference numerals. It should be observed, however, that potentiometers $P_1'$, $P_2'$, $P_3'$ . . . $P_n'$ of Figure 3 are eliminated in Figure 8. This enables amplifiers $A_1$, $A_2$, $A_3$ . . . $A_n$ to be simplified because only a positive output terminal is needed. These amplifiers are thus of the form illustrated in Figure 6. The contactors of potentiometers $P_1$, $P_2$, $P_3$ . . . $P_n$ are connected to corresponding center terminals of respective double-throw, double-pole reversing switches $X_1$, $X_2$, $X_3$ . . . $X_n$. The corresponding second center terminals of these switches are connected to ground. First end terminals $x_1$, $x_2$, $x_3$ . . . $x_n$ are connected to first end terminals of respective isolated resistors $Y_1$, $Y_2$, $Y_3$ . . . $Y_n$. The second end terminals of these isolating resistors are connected to one another and to the input terminal of a summing amplifier 25 which is identical to that shown in Figure 3. Corresponding second end terminals $x_1'$, $x_2'$, $x_3' \ldots x_n'$ of the reversing switches are connected to first end terminals of respective isolating resistors $Y_1'$, $Y_2'$, $Y_3 \ldots Y_n'$. The second end terminals of this second group of isolating resistors are connected to one another and to the input terminal of a second summing amplifier 25' which is identical to summing amplifier 25. The output terminal of amplifier 25' is connected to the input terminal of amplifier 25 through a resistor 127. The output terminal of amplifier 25 is connected to the first input terminal of recorder 26.

When positive coefficients are to be set on potentiometers $P_1, P_2 \ldots P_n$, resistors $Y_1, Y_2 \ldots Y_n$ are connected thereto; and when negative coefficients are to be set, resistors $Y_1', Y_2' \ldots Y_n'$ are connected. Summing amplifier 25' provides a phase reversal of the voltages summed through resistors $Y_1', Y_2' \ldots Y_n'$ to thus establish the negative coefficients.

While the invention has been described in conjunction with present preferred embodiments thereof, it should be apparent that the invention is not limited thereto.

What is claimed is:

1. Apparatus for multiplying two algebraic polynomials which comprises means to establish a first electrical signal which varies in amplitude at spaced time intervals in accordance with the sequential coefficients of one of the polynomials to be multiplied, a plurality of first capacitors, a plurality of second capacitors, a plurality of voltage multiplying means, means connecting the input terminals of said voltage multiplying means across respective ones of said first capacitors, said multiplying means being set to multiply input signals applied thereto by respective coefficients of the second of the polynomials to be multiplied, a plurality of first switching means to connect said first capacitors across respective ones of said second capacitors, a plurality of second switching means to connect said second capacitors across respective different ones of said first capacitors, third switching means to connect said first-mentioned means to the first of said capacitors, means to energize each of said first switching means at a predetermined frequency, means to energize each of said second switching means and said third switching means at said same frequency and alternately with said first switching means, and means to sum the outputs of said voltage multiplying means.

2. The apparatus in accordance with claim 1 wherein said first, second and third switching means comprise respective relays; said means to energize said first switching means comprises a first square wave signal generator; and said means to energize said second and third switching means comprises a second square wave signal generator providing a signal 180° out of phase with the signal of said first generator.

3. The apparatus in accordance with claim 2 wherein said first-mentioned means comprises a seismometer adapted to provide an electrical signal which varies in amplitude in accordance with the amplitude of vibrations incident thereon.

4. The apparatus in accordance with claim 1 wherein said plurality of multiplying means each comprises a potentiometer, means connecting each of said potentiometers across a respective individual one of said first capacitors, the ouputs of said multiplying means being the contactors and first end terminals of said potentiometers.

5. The apparatus in accordance with claim 1 wherein said plurality of multiplying means each comprises a potentiometer, means connecting each of said potentiometers across a respective individual one of said first capacitors; and wherein said means to sum comprises first voltage summing means, second voltage summing means, means to sum the outputs of said first and second voltage summing means, and means to connect the contactors and first end terminals of each of said potentiometers selectively to the inputs of said first and second voltage summing means.

6. The combination in accordance with claim 5 wherein said first voltage summing means provides a signal 180° out of phase with the input signal applied thereto.

7. The apparatus in accordance with claim 1 wherein said plurality of multiplying means each comprises first and second potentiometers; and wherein said means connecting the input terminals of said voltage multiplying means across respective ones of said first capacitors each comprises means to provide voltages 180° out of phase with one another and of amplitudes equal to the voltage across one of said first capacitors, and means applying said voltages across respective ones of said first and second potentiometers, the voltages between the contactors and first end terminals of said potentiometers representing the outputs of each of said voltage multiplying means.

8. Computing apparatus comprising a plurality of first capacitors, a plurality of second capacitors, a plurality of voltage multiplying means, means connecting the input terminals of said voltage multiplying means across respective ones of said first capacitors, a plurality of first switching means to connect said first capacitors across respective ones of said second capacitors, a plurality of second switching means to connect said second capacitors across respective different ones of said first capacitors, third switching means to apply an input signal to the first of said capacitors, means to energize each of said first switching means at a predetermined frequency, means to energize each of said second switching means and third switching means at said same frequency and alternately with said first switching means, and means to sum the outputs of said voltage multiplying means.

References Cited in the file of this patent

UNITED STATES PATENTS

| | | |
|---|---|---|
| 2,394,924 | Luhn | Feb. 12, 1946 |
| 2,425,405 | Vance | Aug. 12, 1947 |
| 2,679,356 | Briers | May 25, 1954 |
| 2,703,389 | Schwartz | Mar. 1, 1955 |
| 2,742,613 | Sontheimer | Apr. 17, 1956 |
| 2,794,965 | Yost | June 4, 1957 |
| 2,801,351 | Calvert et al. | July 30, 1957 |

OTHER REFERENCES

A Pulse-Operated Auto-Correlator (Stoneman et al.), Royal Aircraft Establishment, Technical Note No. G.W. 225, December 1952, pages 1, 3–8 and 10–13.

"A New Method of Determining Correlation Functions of Stationary Time Series" (Lampard), Preceedings of the Institute of Electrical Engineering (London), March 1955, vol. 102, No. 1, part C, pages 35–41, 235–61CF.